US012449031B2

(12) United States Patent
Hagerman

(10) Patent No.: US 12,449,031 B2
(45) Date of Patent: Oct. 21, 2025

(54) CONTROL SYSTEM FOR CONTROLLING AN OIL LEVEL IN A GEARBOX OF A VEHICLE, ASSOCIATED GEARBOX ASSEMBLY AND VEHICLE

(71) Applicant: VOLVO TRUCK CORPORATION, Gothenburg (SE)

(72) Inventor: Henrik Hagerman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 51 days.

(21) Appl. No.: 18/513,728

(22) Filed: Nov. 20, 2023

(65) Prior Publication Data

US 2024/0175487 A1    May 30, 2024

(30) Foreign Application Priority Data

Nov. 25, 2022 (EP) ..................................... 22209683

(51) Int. Cl.
*F16H 57/04* (2010.01)

(52) U.S. Cl.
CPC ..... *F16H 57/0447* (2013.01); *F16H 57/0435* (2013.01)

(58) Field of Classification Search
CPC ... F16H 3/091; F16H 57/0447; F16H 57/0435
See application file for complete search history.

(56) References Cited

U.S. PATENT DOCUMENTS

| 6,644,439 | B2 | 11/2003 | Schnitzer |
| 2005/0139401 | A1 | 6/2005 | Fujioka |
| 2018/0087655 | A1 | 3/2018 | Arnelof et al. |
| 2019/0011036 | A1 | 1/2019 | Tochtermann |

FOREIGN PATENT DOCUMENTS

| CN | 106195234 A | * 12/2016 | ......... F16H 57/0447 |
| CN | 114673781 A | * 6/2022 | |
| EP | 3227584 B1 | 11/2015 | |
| WO | 2008076061 A1 | 6/2008 | |

OTHER PUBLICATIONS

European Search Report for EP Patent Application No. 22209683.6, mailed Apr. 18, 2023, 2 pages.

* cited by examiner

Primary Examiner — William C Joyce
(74) Attorney, Agent, or Firm — Sage Patent Group

(57) ABSTRACT

A control system, for controlling an oil level in a gearbox of a vehicle, includes a supply line, a return line, a first valve and a second valve. The first and second valves are respectively controlled by a first fork and a second fork of the gearbox. The return line is connected to the supply line through the first valve and the second valve, which are arranged in serial, the first and second valves being both in the open position when the first and second forks are together in a direct drive configuration that engages a direct drive gear selection of the gearbox, so that the return line is pressurized when both valves are open and the supply line is pressurized. The control system includes a flow control unit, which is configured to lower the oil level in an oil sump of the gearbox when the return line is pressurized.

6 Claims, 6 Drawing Sheets

CONTROL SYSTEM FOR CONTROLLING AN OIL LEVEL IN A GEARBOX OF A VEHICLE, ASSOCIATED GEARBOX ASSEMBLY AND VEHICLE

CROSS REFERENCE TO RELATED APPLICATION

This application claims priority to European Patent Application Number 22209683.6, filed on Nov. 25, 2022, the disclosure and content of which is incorporated by reference herein in its entirety.

TECHNICAL FIELD

The disclosure relates generally to the field of gearbox lubrication, especially for road vehicles. In particular aspects, the disclosure relates to a control system for controlling an oil level in a gearbox of a vehicle, to a gearbox assembly comprising such a control system and to a vehicle comprising such a gearbox assembly. The disclosure can be applied in heavy-duty vehicles, such as trucks, buses, and construction equipment. Although the disclosure may be described with respect to a particular vehicle, the disclosure is not restricted to any particular vehicle.

BACKGROUND

In today's gearboxes, for example for road vehicles such as trucks or buses, the lubrication and cooling of the gears are usually accomplished with an oil sump where the gears of the countershaft dip into the oil. When the countershaft rotates, the gear wheels of the countershaft also transport oil to the gear wheels on the main shaft. In some gearboxes, there may also be a pipe delivering oil jets to gear wheels. The oil itself is cooled by convection of heat to the gearbox housing and, in some trucks, cooled with a transmission cooler through which the oil is pumped.

The oil sump lubrication/cooling is a significant source of transmission losses. A notable part of the load-independent losses in the transmission are due to the countershaft rotating in the oil sump, commonly referred to as "churning losses".

Solutions to reduce the churning losses can have the drawback of increasing the gear tooth temperature. Excessive gear tooth temperatures can drastically reduce the life of the gear teeth. However, when the transmission is in a selected gear called "direct drive", the power is not transferred through the gear teeth and then there is very little need for cooling. In this state, it is therefore possible to lower the oil level in the oil sump of the gearbox, in order to reduce churning losses.

The disclosure aims at providing a control system for controlling an oil level in a gearbox of a vehicle, such control system being reliable and robust.

SUMMARY

According to a first aspect of the disclosure, the control system comprises a supply line, which is configured to be connected to a pressurized upstream oil supply of the gearbox, a return line, which is configured to be connected to the supply line, a first valve and a second valve. The first valve is configured to be controlled by a first fork of the gearbox, and to switch between an open position and a closed position, according to a position of the first fork. The second valve is configured to be controlled by a second fork of the gearbox, the second fork being different from the first fork. The second valve is configured to switch between an open position and a closed position, according to a position of the second fork. A first end of the return line is connected to the supply line through the first valve and the second valve, the first and second valves being arranged in serial, the first and second valves being both in the open position when the first and second forks are together in a direct drive configuration that engages the direct drive gear selection of the gearbox, so that the return line is pressurized when both valves are open and when the supply line is pressurized. The control system comprises a flow control unit, which is connected to a second end of the return line and which is configured to lower the oil level in an oil sump of the gearbox when the return line is pressurized.

Thanks to the disclosure, the control system allows controlling the oil level of the oil sump by using only mechanical and hydraulic components, which are robust and more reliable than electronic or electro-mechanic components. Furthermore, in case of dysfunction of any component of the control system, the oil level in the oil sump remains at the same level as when the gearbox is not in the direct drive gear selection, which prevents potential damage to the gearbox.

In some examples, the first valve and the second valve are both piston valves. A technical benefit may include an improved reliability compared to other types of valve.

In some examples, the flow control unit comprises a third valve, which is different from the first and second valves and which is in a closed position when the return line is pressurized, whereas the third valve is configured to prevent oil from a filling circuit to fill the oil sump when the third valve is in the closed position.

In some examples, the control system comprises an oil reservoir, which is connected to the return line and which is filled by oil flowing through the supply line and the return line when the first and second valves are both in an open position, whereas the flow control unit comprises a dump valve, which is arranged between the reservoir and the oil sump of the gearbox, so that oil contained in the reservoir flows into the oil sump when at least one of the first and second valves is in a closed position. A technical benefit may include the fact that the reservoir may have an arbitrary oil volume.

In some examples, the oil reservoir is part of a gearbox control unit of the gearbox. A technical benefit may include the fact that the gearbox control unit has a higher oil volume capacity.

In some examples, the flow control unit comprises a two-split oil gutter, with a fixed part and a mobile part, the mobile part being in a closed position when the return line is pressurized. A technical benefit may include having a more compact gearbox, without any supplemental reservoir.

According to a second aspect of the disclosure, the disclosure concerns a gearbox assembly, comprising: a gearbox, and the control system as previously defined. The gearbox comprises a main shaft and a countershaft, a gear ratio of the gearbox being controlled by several forks, including a first fork and a second fork, the gearbox having a direct drive configuration, where traction power does not pass through the countershaft and where the first fork and the second fork are in the direct drive configuration that engages the direct drive gear selection of the gearbox.

According to a third aspect of the disclosure, the disclosure concerns a vehicle, comprising a gearbox assembly as previously defined. Such a vehicle offers improved energy consumption, thanks to reduced churning losses.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
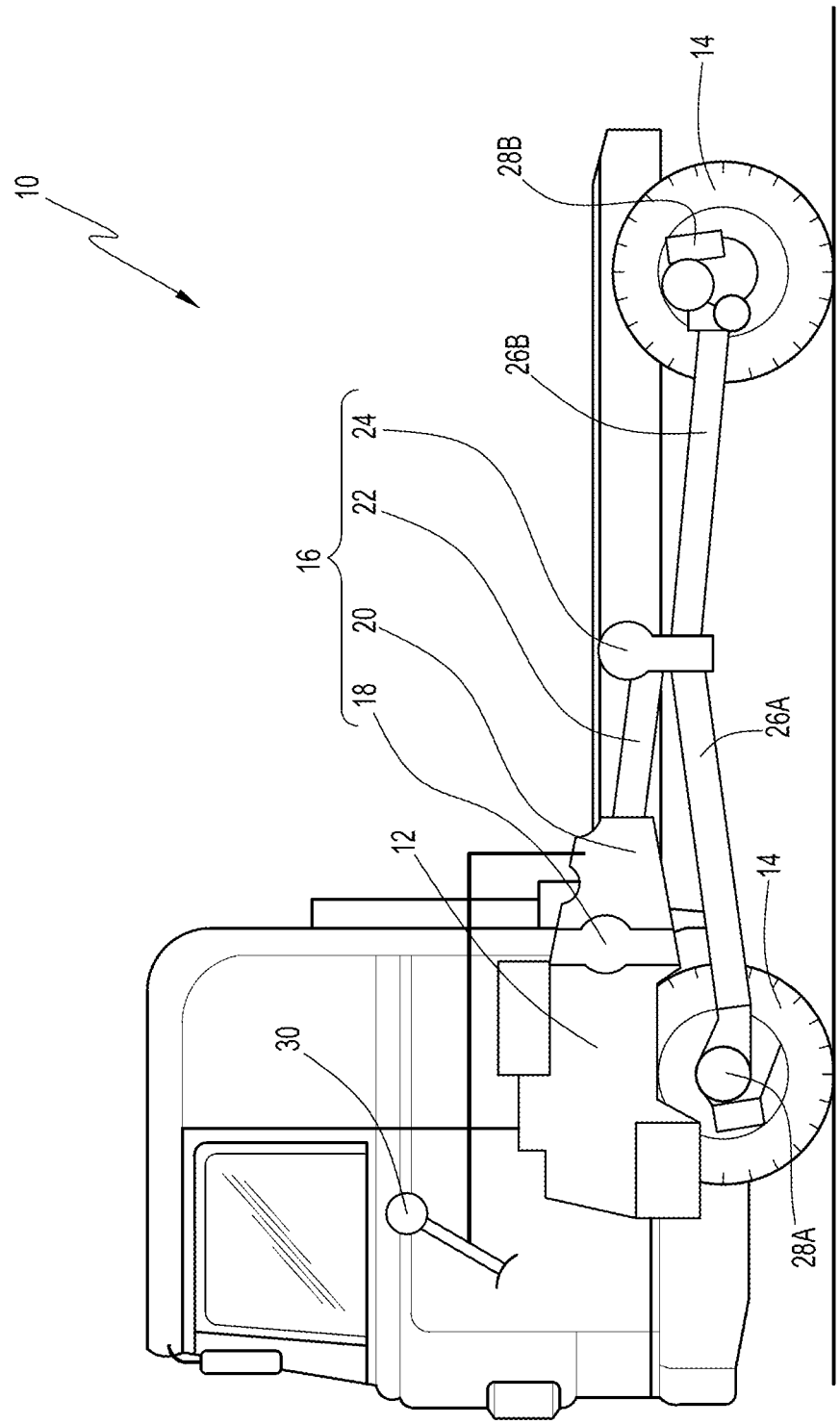
FIG. 1 is a schematic side view of a vehicle according to a first embodiment of the disclosure.

A vehicle 10 according to the disclosure is represented on FIG. 1. The vehicle 10 is a road vehicle, here a truck. Alternatively, the vehicle 10 is a bus, or a different type of heavy duty vehicle. The vehicle 10 comprises an engine 12, to generate motion power, wheels 14, and a transmission 16 to transmit the motion power to the wheels. Following the traction power from the engine 16 to the wheels 14, the transmission 16 includes a clutch 18, a gearbox 20, a transmission shaft 22, a transfer case 24, and from the transfer case 24, a front drive shaft 26A leading to a front differential 28A, and a rear drive shaft 26B leading to a rear differential 28B. The gearbox 20 is controlled by a driver of the vehicle 10, here with a gearstick 30.

Figure 2:
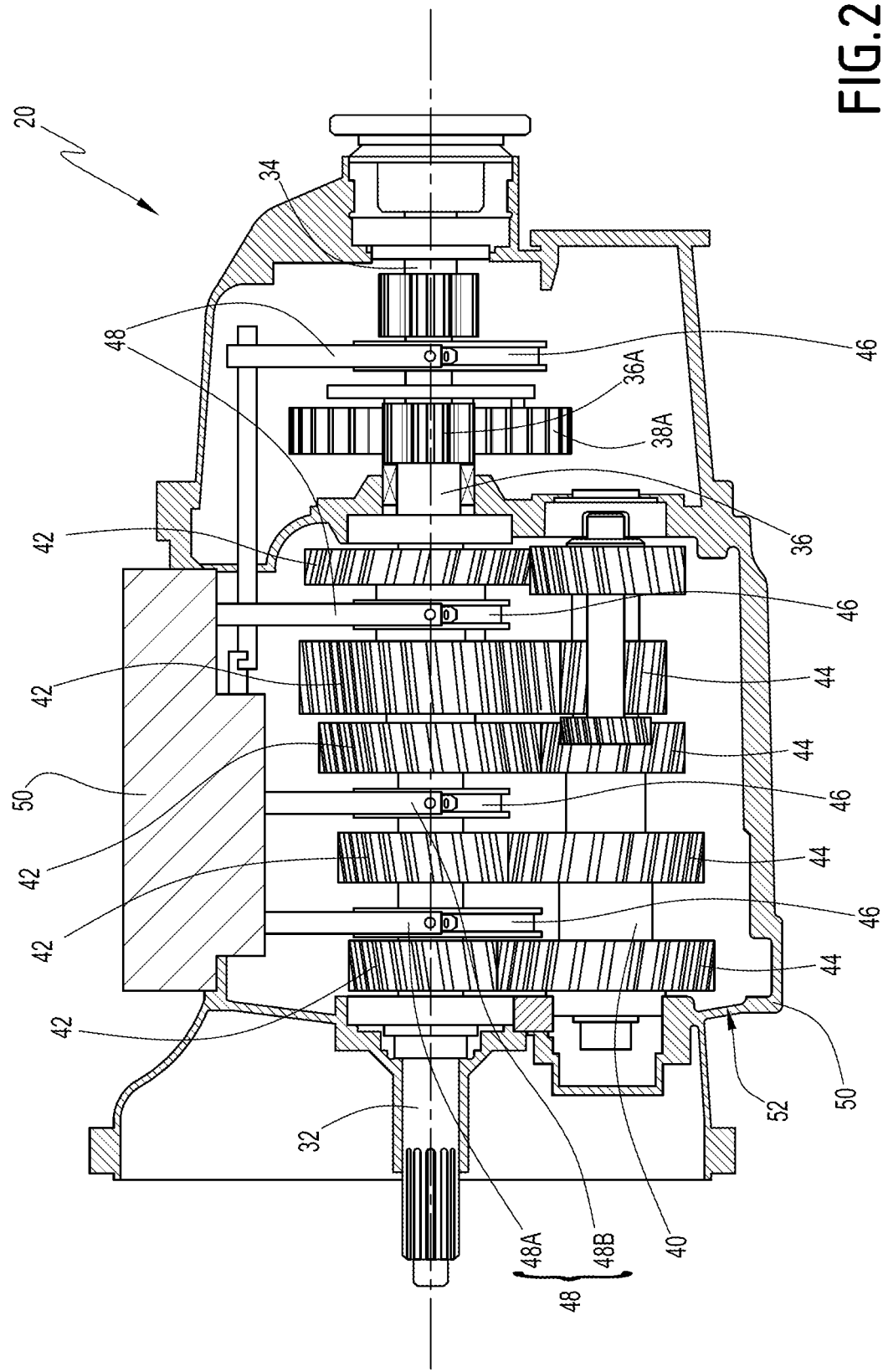
FIG. 2 is an exemplary cross section of a gearbox of the vehicle of FIG. 1.

A non-limitative example of the gearbox 20 is schematically shown on FIG. 2. The gearbox 20 is represented in a working orientation, which corresponds to an orientation of the gearbox 20 when mounted on the vehicle 10 that rests on a horizontal surface. The gearbox 20 comprises a drive shaft 32, which is configured to be driven by the engine 12 through the clutch 18, a range shaft 34, which is configured to be connected to the transmission shaft 22. The range shaft 34 is aligned with the drive shaft 32. The gearbox 20 also comprises a main shaft 36, which is arranged between, and aligned with, the drive shaft 32 and the range shaft 34. In the illustrated example, the range 34 comprises a planetary gear set 38A, which is arranged around a fixed central gear 36A arranged at an end of the main shaft 36. The gear box 20 also comprises a counter shaft 40, which extends parallel to the main shaft 36.

Each shaft among the drive shaft 32, the range shaft 34, the main shaft 36 comprises one or more gears wheels 42, each gear wheel being associated with a respective counter gear 44 of the countershaft 40. The gear wheels 42 and the planetary gear set 38A are selectively locked in rotation or freed in rotation relative to the respective shaft on which they are mounted, by means of a set of sliding sleeves 46. The position of each sleeve 46 is controlled by a respective fork 48. In the illustrated example, the gearbox 20 comprises four sleeves 46, each associated with a respective fork 48. The gearbox 20 also comprises a control unit 50, also called "GCU" in short for gearbox control unit, which controls the position of each fork 48.

The gearbox 20 also comprises a casing 50, which delimits an oil sump 52. The oil sump 52 is an internal volume of the casing 50, configured to be filled with lubrication oil for various elements of the gearbox, in particular for the countershaft 40.

Depending on the position of each sleeve 46, each guided by a respective fork 48, a specific ratio between a rotation speed of the drive shaft 32 and a rotation speed of the range shaft 24 is achieved. In a specific configuration of the gearbox 20 called "direct drive", the driving force of the drive shaft 32 is transmitted to the main shaft 36 without passing through the countershaft 40. As a result, the counter gears 44 do not require as much cooling and lubrication as in other configurations of the gearbox 20. It is therefore possible to reduce the oil level in the oil sump 52, in order to reduce churning losses. It is however still necessary to lubricate and cool the main shaft 36. To this end, the gearbox 20 usually comprises an oil supply system 54, for example an oil pump, which is configured to pump oil from the oil sump 52 and pour the oil onto the gear wheels 42 and/or onto bearings supporting the main shaft 63 when the vehicle 10 is in use. The bearings are not represented. The oil supply 54 is pressurized when the vehicle 10 is in use.

The forks 48 include a first fork 48A called "split fork", which operates one of the sleeves 46 arranged between the drive shaft 32 and the countershaft 40, and a second fork 48B called "2/3 fork", which operates one of the sleeves 46 arranged between the countershaft 40 and the main shaft 36. The direct drive configuration is associated with a specific position of the first and second forks 48A and 48B.

Figure 3:
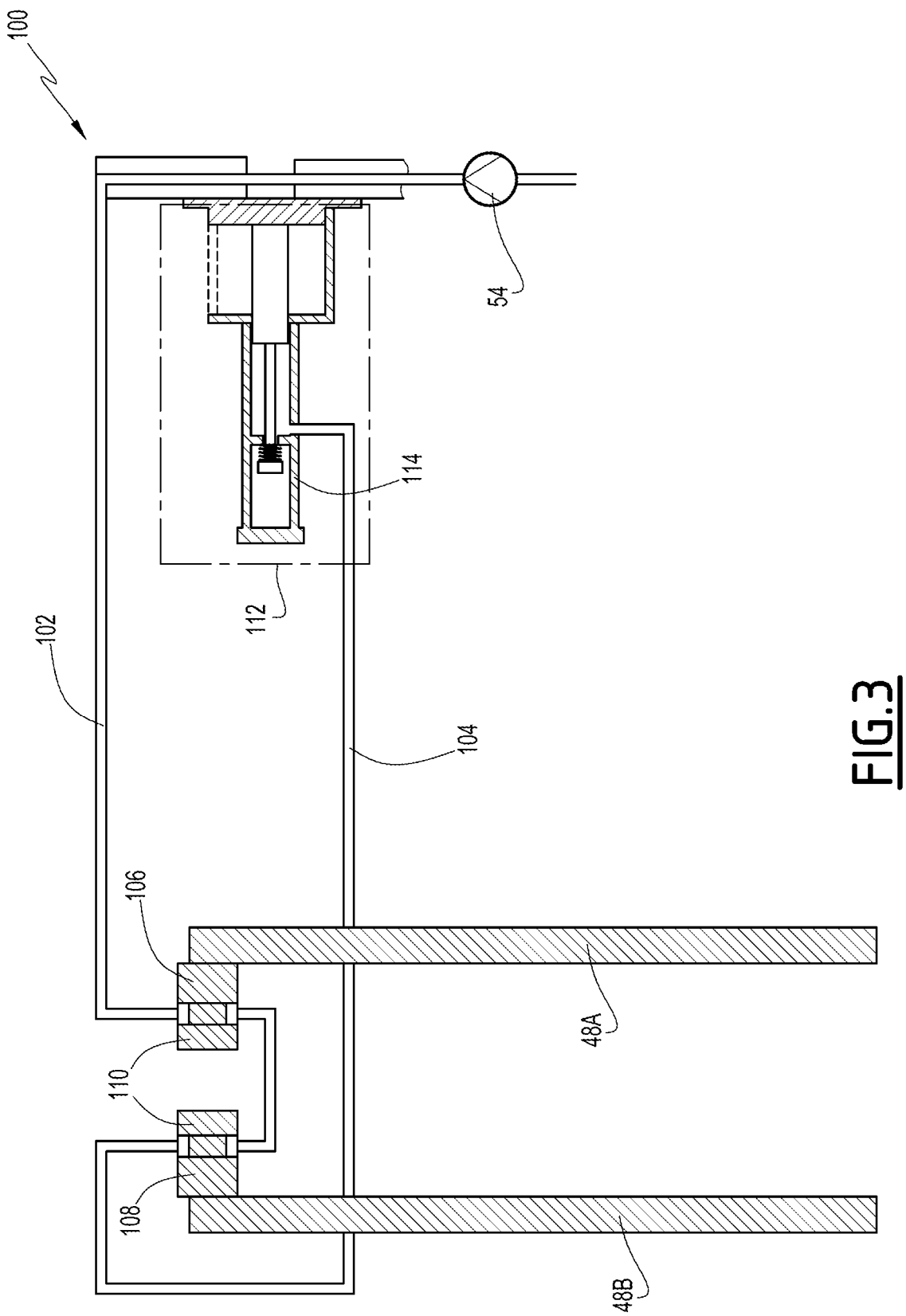
FIG. 3 is a schematic view of a control system of the vehicle of FIG. 1, where the control system is according to the first embodiment of the disclosure.

FIG. 3 is a schematic representation of a control system 100 for controlling an oil level in the gearbox 20. Together, the gearbox 20 and the control system 100 are part of a gearbox assembly. The control system 100 comprises a supply line 102, which is configured to be connected to a pressurized upstream oil supply of the gearbox 20. For example, the supply line 102 is connected to the oil pump 54. When the vehicle 10 operates normally, in particular when the gearbox 20 is in the direct drive configuration, the supply line 102 is filled with pressurized oil. For example, the supply line 102 is a hose, or a metallic pipe.

The control system 100 also comprises a return line 104, which is configured to be connected to the supply line 102, a first valve 106 and a second valve 108. The first valve 106 is configured to be controlled by the first fork 48A of the gearbox 20, and to switch between an open position and a closed position, according to a position of the first fork 48A. The second valve 108 is configured to be controlled by the second fork 48B of the gearbox 20, and to switch between an open position and a closed position, according to a position of the second fork 48B.

The supply line 102 and the return line 104 are connected to each other through the first valve 106 and the second valve 108, the first and second valves 106 and 108 being arranged in serial, the first and second valves 106 and 108 being both in the open position when the first and second forks 48A and 48B are together in a direct drive configuration, that engages the direct drive gear selection of the gearbox 20, so that the return line 104 is pressurized when both valves 106 and 108 are open and when the supply line 102 is pressurized.

Preferably, the first valve 106 and the second valve 108 are both piston valves, that let pass the oil pressure when in the open position. Each valve 106 or 108 comprises a piston 110, that is guided inside a cylinder and whose position is controlled by the respective fork 48A or 48B. Piston valves are simple and robust, and do not require a high force to be controlled.

The control system 100 also comprises a flow control unit 112, which is connected to the return line 104 and which is configured to lower the oil level in the gearbox 20 when the return line 104 is pressurized. More precisely, the flow control unit 112 is configured to lower the oil level in the oil sump 52 when the return line 104 is pressurized, i.e. when the gearbox 20 is in the direct drive configuration, causing the first and second valves 106 and 108 to be open, and when the pump 54 functions properly. If one of the components of the control system 100 among the pump 54, the supply line 102, the first valve 106, the second valve 108 and the return line 104, does not work properly, then the pressure in the return line 104 drops, leading to the flow control unit 112 to stop lowering the oil level in the oil sump 52. In other words, the flow control unit 112 lowers the oil level in the oil sump 52 as long as the first valve 106 and the second valve 108 are both in the open configuration. As soon as at least one of the first and second valves is in the closed configuration, the flow control unit 112 stops lowering the oil level in the oil sump 52. The setup of the control system 100 has the advantageous feature that it will reset if the oil system pressure is lost, for instance if the vehicle 10 stops or if the oil level in the oils sump 52 is to low and the pump 54 starts sucking air.

In the first embodiment of the disclosure, the flow control unit 112 comprises a third valve 114, which is different from the first and second valves 106 and 108. In the illustrated example, the third valve 114 is a spring-loaded piston actuator that controls the oil level in the oil sump 52.

Figure 4:
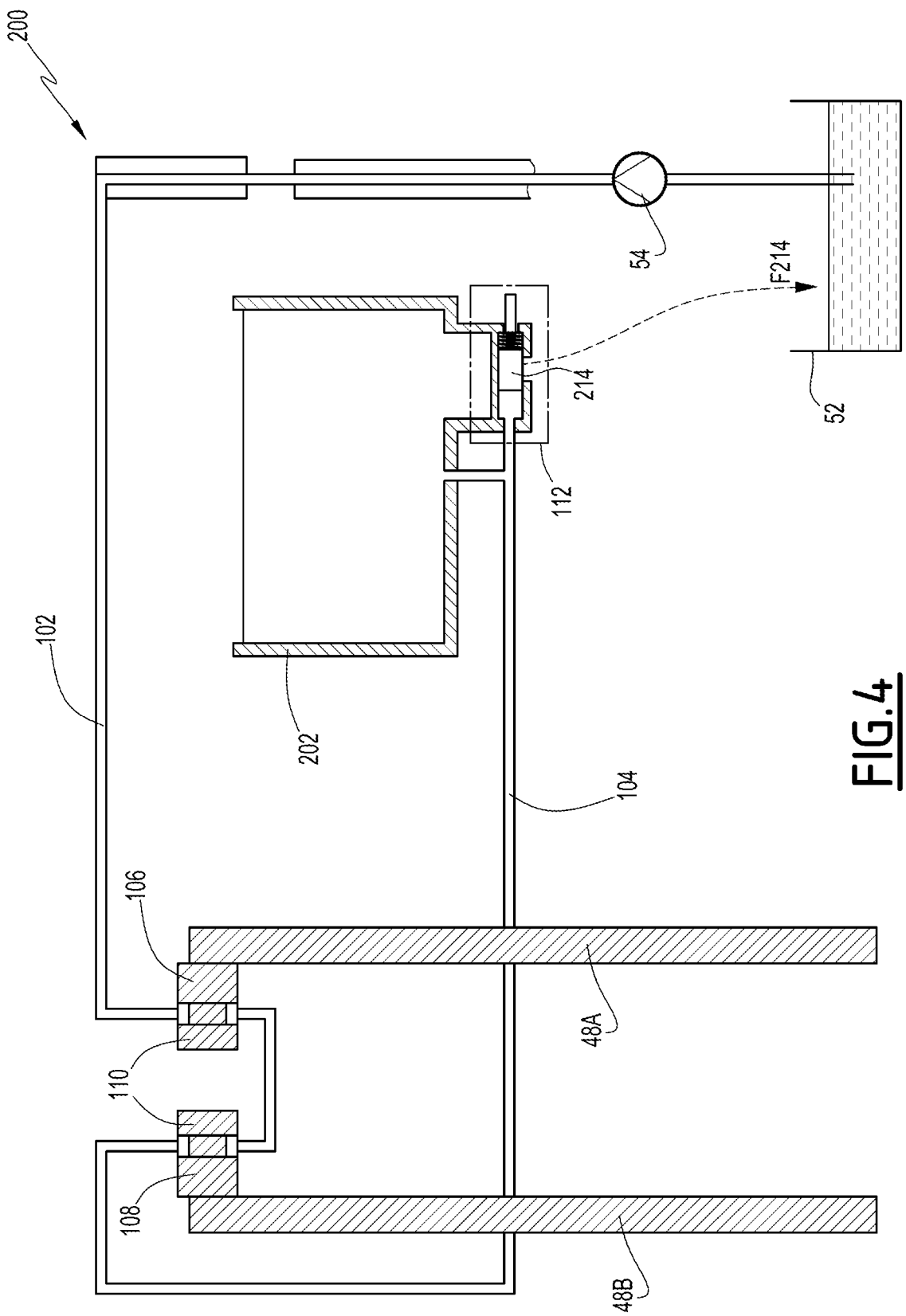
FIG. 4 is a schematic view of a control system according to a second embodiment of the disclosure.

A control system 200 according to an alternative second embodiment of the disclosure is represented on FIG. 4. In this embodiment, the parts of the control system 200 identical or similar to the ones of the first embodiment have the same reference numerals. Hereafter, mainly the differences between the first and second embodiments are detailed.

In this second embodiment, the control system 200 comprises an oil reservoir 202, which is connected to the return line 104 and which is filled by oil flowing through the supply line 102 and the return line 104 when the first and second valves 106 and 108 are both in an open position. In other words, when the gearbox 20 is in the direct drive configuration, both the first valve 106 and the second valve 108 are in the open configuration. The supply line 102 and the return line 104 are pressurized by the pump 54, and the oil from the oil sump 52 is pumped by the pump 54 into the reservoir 202.

The flow control unit 112 comprises a dump valve 214, which is in a closed configuration when the return line 104 is pressurized, and in an open configuration otherwise. The dump valve 214 is arranged between the reservoir 202 and the oil sump 52 of the gearbox 20, so that oil contained in the reservoir 202 flows into the oil sump when the dump valve 214 is in the open position, that is to say when at least one of the first and second valves 106 and 108 is in the closed position. On FIG. 4, the flow of oil from the dump valve 214 to the oil sump 52 is represented by an arrow F214 in broken line. In other words, the reservoir 202 is a buffer reservoir for the oil of the oil sump 52. When the gearbox 20 is in the direct drive gear selection, the oil from the oil sump 52 is transferred to the reservoir 202. When the gearbox 20 quits the direct drive gear selection, the oil flows back from the reservoir 202 to the oil sump 52. Depending on the spatial arrangement of the dump valve 214 relatively to the oil sump 52, a return duct is arranged between the dump valve 214 and the oil sump 52. The return duct is not represented. Preferably, the oil from the reservoir 202 flows to oil sump 52 by gravity, i.e. without any specific pump, so that the control system 200 remains robust.

Figure 5:
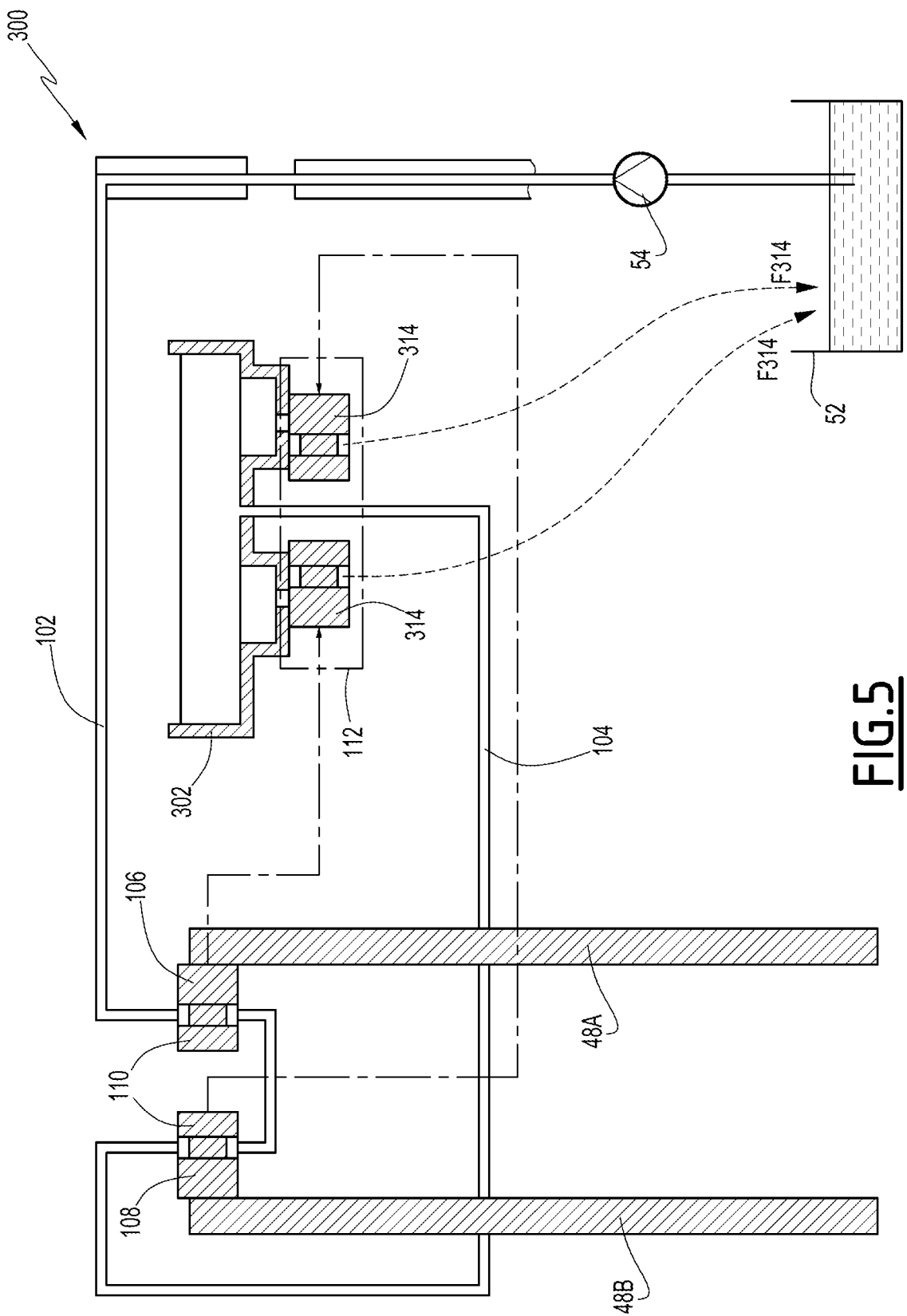
FIG. 5 is a schematic view of a control system according to a third embodiment of the disclosure.

A control system 300 according to an alternative third embodiment of the disclosure is represented on FIG. 5. In this embodiment, the parts of the control system 300 identical or similar to the ones of the previous embodiments have the same reference numerals. Here-after, mainly the differences between the first and second embodiments are detailed.

In this third embodiment, the control system 300 comprises a reservoir 302, which is integrated in the control unit 50. The flow control unit 112 comprises two dump valves 314, each dump valve 314 being controlled by a respective valve among the first valve 106 and the second valve 108. When the first valve 106 is in the open configuration, then the associated dump valve 314 is in the closed configuration, whereas when the first valve 106 is in the closed configuration, then the associated dump valve 314 is in the open configuration. Similarly, when the second valve 108 is in the open configuration, then the associated dump valve 314 is in the closed configuration, whereas when the second valve 108 is in the closed configuration, then the associated dump valve 314 is in the open configuration. In other words, oil contained in the reservoir 302 flows into the oil sump 52 when at least one of the first valve 106 and the second valve 108 is the closed position. On FIG. 5, the flow of oil from each dump valve 314 to the oil sump 52 is represented by a respective arrow F314 in broken line. In an alternative, not shown embodiment, at least one valve among the first valve 106 and the second valve 108 is integrated with the associated dump valve 314. For example, the first valve 106 and the associated dump valve 314 share the same piston 110.

Figure 6:
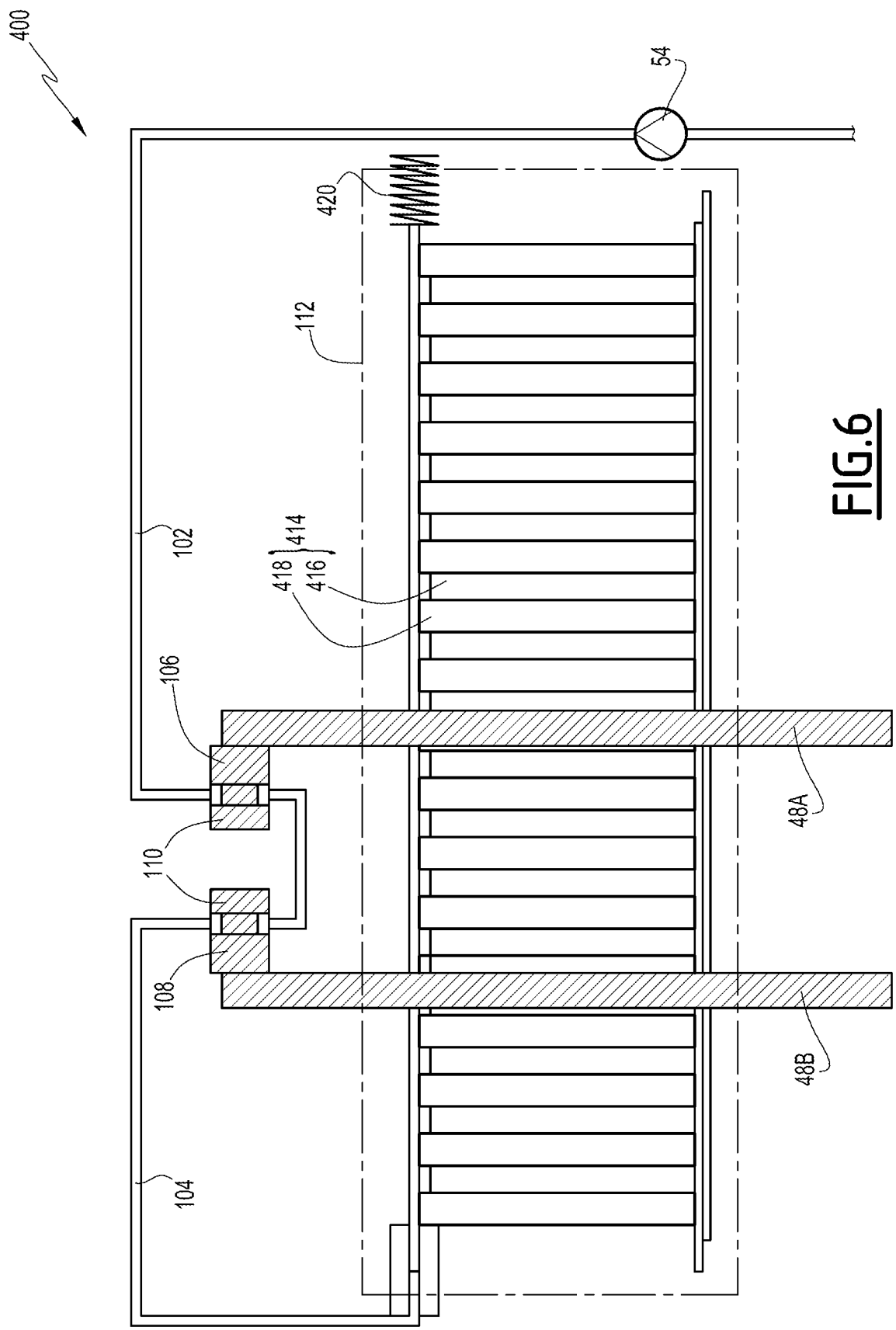
FIG. 6 is a schematic view of a control system according to a fourth embodiment of the disclosure.

A control system 400 according to an alternative fourth embodiment of the disclosure is represented on FIG. 6. In this embodiment, the parts of the control system 400 identical or similar to the ones of the previous embodiments have the same reference numerals. Here-after, mainly the differences between the first and second embodiments are detailed.

In this fourth embodiment, the control system 400, the flow control unit 112 comprises a two-split oil gutter 414. The oil gutter 414 comprises a fixed part 416, here with parallel slits, and a mobile part 418, which is mobile between a closed position, where the mobile part 418 prevents the oil to flow through the fixed part 416, and an open position, where the mobile part 418 does not prevent the oil to flow through the fixed part 416. When the return line 104 is pressurized, the mobile part 418 is pushed to the closed position, whereas when the return line 104 is not pressurized, the mobile part 418 moves back to its open position thanks to a return element 420, here represented by a spring. On FIG. 6, the oil gutter 414 is shown in a closed configuration.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A gearbox assembly comprising:
   a gearbox of a vehicle; and
   a control system for controlling an oil level in the gearbox, wherein the gearbox comprises a main shaft and a countershaft, a gear ratio of the gearbox being controlled by several forks, including a first fork and a second fork, the gearbox having a direct drive configuration, where traction power does not pass through the countershaft and where the first fork and the second fork are in the direct drive configuration that engages a direct drive gear selection of the gearbox, wherein the control system comprises:
   a supply line, which is connected to a pressurized upstream oil supply of the gearbox,
   a return line, which is connected to the supply line,
   a first valve and a second valve,
   wherein:
      the first valve is configured:
         to be controlled by the first fork of the gearbox, and
         to switch between an open position and a closed position, according to a position of the first fork,
      the second valve is configured:
         to be controlled by the second fork of the gearbox, the second fork being different from the first fork, and
         to switch between an open position and a closed position, according to a position of the second fork,
      a first end of the return line is connected to the supply line through the first valve and the second valve, the first and second valves being arranged in serial, the first and second valves being both in the open position when the first and second forks are together in the direct drive configuration that engages the direct drive gear selection of the gearbox, so that the return line is pressurized when both valves are open and when the supply line is pressurized,
      the control system comprises a flow control unit, which is connected to a second end of the return line and which is configured to lower the oil level in an oil sump of the gearbox when the return line is pressurized.

2. The gearbox assembly according to claim 1, wherein:
   the first valve and the second valve are both piston valves.

3. The gearbox assembly according to claim 1, wherein:
   the flow control unit comprises a third valve, which is different from the first valve and from the second valve and which is in a closed position when the return line is pressurized,
   the third valve is configured to prevent oil from a filling circuit to fill the oil sump when the third valve is in the closed position.

4. The gearbox assembly according to claim 1, wherein:
   the control system comprises an oil reservoir, which is connected to the return line and which is filled by oil flowing through the supply line and the return line when the first and second valves are both in an open position,
   the flow control unit comprises a dump valve, which is arranged between the reservoir and the oil sump, so that oil contained in the reservoir flows into the oil sump when at least one of the first valve and the second valve is the closed position.

5. The gearbox assembly according to claim 4, wherein:
   the oil reservoir is part of a gearbox control unit of the gearbox.

6. A vehicle comprising the gearbox assembly according to claim 1.

* * * * *